(12) United States Patent
Lawrence

(10) Patent No.: US 7,286,084 B2
(45) Date of Patent: Oct. 23, 2007

(54) MULTIPLE ANTENNA MULTI-FREQUENCY MEASUREMENT SYSTEM

(75) Inventor: David G. Lawrence, Mountain View, CA (US)

(73) Assignee: Novariant, Inc., Fremont, CA (US)

( * ) Notice: Subject to any disclaimer, the term of this patent is extended or adjusted under 35 U.S.C. 154(b) by 0 days.

(21) Appl. No.: 11/513,542

(22) Filed: Aug. 30, 2006

(65) Prior Publication Data

US 2007/0001899 A1  Jan. 4, 2007

Related U.S. Application Data

(60) Division of application No. 10/789,868, filed on Feb. 27, 2004, now Pat. No. 7,138,944, which is a continuation of application No. PCT/US02/36960, filed on Nov. 19, 2002.

(60) Provisional application No. 60/332,278, filed on Nov. 20, 2001.

(51) Int. Cl.
*H04Q 7/20* (2006.01)

(52) U.S. Cl. .................... 342/357.12; 357/357.02; 357/357.04; 357/174

(58) Field of Classification Search ................ 342/174, 342/357.02, 357.03, 357.04, 357.06, 357.12, 342/368–377; 701/215
See application file for complete search history.

(56) References Cited

U.S. PATENT DOCUMENTS

| | | | |
|---|---|---|---|
| 5,694,416 A | 12/1997 | Johnson | |
| 5,883,597 A | 3/1999 | DeWulf | |
| 5,920,278 A | 7/1999 | Tyler et al. | |
| 5,936,576 A | 8/1999 | Shimura | |
| 6,166,690 A | 12/2000 | Lin et al. | |
| 6,489,923 B1 * | 12/2002 | Bevan et al. | 342/378 |
| 6,549,164 B2 | 4/2003 | Paschen et al. | |
| 6,784,831 B1 | 8/2004 | Wang et al. | |
| 2005/0242990 A1 | 11/2005 | Lawrence et al. | |

OTHER PUBLICATIONS

"Optimum Semi-Codeless Carrier Phase Tracking of L2," by K.T. Woo; NavCom Technology, Inc. Redondo Beach, CA; Presented at the 12th International Technical Meeting of the Satellite Division of the Institute of Navigation, Nashville, TN—Sep. 14-17, 1999.

"Attitude Determination Using GPS—Development Of An All Solid-State Guidance, Navigation, and Control Sensor For Air and Space Vehicles Based on the Global Positioning System," Excerpt from A Dissertation Submitted to the Department of Aeronautics and Astronautics and the Committee of Graduate Studies of Stanford University; by Clark Emerson Cohen; dated Dec. 1992.

JNSGyro-4; http://www.javad.com/jns/products/JNSGyro-4.html; printed on Feb. 2, 2004; at least as early as Apr. 24, 2003.

* cited by examiner

*Primary Examiner*—Thomas H. Tarcza
*Assistant Examiner*—Fred H. Mull
(74) *Attorney, Agent, or Firm*—Brinks Hofer Gilson & Lione

(57) ABSTRACT

A measurement system and an associated method for determining the positions of multiple antennas to centimeter level accuracy. A plurality of first filters, one filter for each antenna of a plurality of antennas, are each operable to obtain information from a respective one of the plurality of antennas at a primary frequency. A second filter connects with at least one of the plurality of antennas. A processor calibrates biases for the information at the primary frequency with a RF path bias calibration algorithm as a function of an output of the second filter.

5 Claims, 2 Drawing Sheets

MULTIPLE ANTENNA MULTI-FREQUENCY MEASUREMENT SYSTEM

REFERENCE TO RELATED APPLICATIONS

This application is a divisional of U.S. application Ser. No. 10/789,868, filed Feb. 27, 2004, now U.S. Pat. No. 7,138,944, which is a continuation of PCT Application Serial No. PCT/US02/36960, filed Nov. 19, 2002 (designating the United States and published in English), which claims priority to U.S. Provisional patent application Ser. No. 60/332,278 filed Nov. 20, 2001, the entire disclosures of which are incorporated herein by reference.

BACKGROUND

The present invention relates to GPS measurement systems, and more particularly with a measurement system and a method for tracking an object using a number of multi-frequency antennas.

The Global Positioning System (GPS) is a satellite based navigation system having a constellation of 24 Earth orbiting satellites. These satellites are approximately uniformly dispersed around six circular orbits having four satellites each. Theoretically, four or more GPS satellites are visible from most points on the Earth's surface.

Each GPS satellite presently transmits at two frequencies: L1 (1575.42 MHz) and L2 (1227.60 MHz). There exists provision (for the future) for a third frequency L5 (1176.45 MHz) as well. The L1 frequency has two different spread-spectrum codes modulated on it: a coarse acquisition (C/A) code and a Y code. The C/A code is an unclassified code intended for civilian navigation. It has a chipping rate of 1.023 MHz and a sequence length of 1023 chips. The Y code is a classified unknown code; people doing research in this area have found it to be the product of two codes: a precise (P) code and a W code. The P code is an unclassified code with a chipping rate of 10.23 MHz. The P code is long enough that it does not repeat during a week; it is reset at the beginning of the GPS week for each satellite. The P code is mixed with the classified W code to get an encrypted Y code. The W code has been empirically found to have a chipping rate of approximately 500 KHz. The Y code is modulated onto the L1 carrier in quadrature with the C/A code and with half the power of the C/A code. The Y code is also modulated onto the L2 carrier signal with half the power of L1 Y code. Both C/A and P codes are unique for each satellite.

GPS receivers are commonly used for a variety of applications involving tracking of the position of various objects. The object to be tracked is coupled to one or more GPS antennas that receive signals from the GPS satellites. Depending upon the level of accuracy and response time desired by a user, an appropriate method of obtaining position of an object using GPS can be adopted.

A commonly used method that yields the position information (within meters) is the pseudorange method. This method utilizes the C/A code and/or the P code modulated onto the carrier signals from the GPS satellites.

Use of a reference antenna that employs carrier phase measurements and has known coordinates can further enhance the accuracy of position determination of the antennas. Differential carrier phase GPS measurement is a technique which determines the position of a given antenna with respect to a reference antenna. The other antennas, known as roving antennas, are free to roam around. Measurements of the carrier phase at the reference antenna and the roving antennas are used to calculate the relative position of the antennas to centimeter level accuracy. Before the carrier phase measurements can be used for determining position accurately, the carrier cycle ambiguity or the number of complete carrier cycles between the antennas (reference antenna and roving antennas) must be determined.

Typically, the conventional approach for resolving carrier cycle ambiguities starts with a code-based differential GPS solution. Thereafter, the integer count for all the L1 satellite signals used in the position solution is determined. The integer solution is often ambiguous due to errors induced by receiver noise and multipath for both code and carrier based measurements. The integer solution is averaged over a period of time to converge on the exact solution. This process benefits from the intervening satellite motion. However, the process may take from a single measurement to several minutes worth of data to yield the correct integers depending on the number of satellites, the quality of the phase measurements and the desired level of confidence.

Dual frequency receivers that utilize both L1 and L2 frequency signals can determine carrier cycle ambiguities much faster than a single frequency receiver. A technique that uses both L1 and L2 phase measurements is faster than the one using just L1 carrier phase measurements. The phase of the L2 carrier is used to assist in resolving the carrier cycle ambiguity of the L1 signals.

The L1 carrier can be recovered by using a standard code correlation technique as the C/A code is known for each of the satellites. The L2 carrier signal is encrypted, thus only military GPS receivers that are aware of the encryption key can reconstruct the L2 signal with high accuracy. Civilian receivers can also reconstruct the L2 carrier signal using any of the known standard techniques, most of which derive the L2 carrier using the L1 carrier. However, the signal to noise ratio (SNR) of resulting L2 signal is lower than L2 signals reconstructed using military receivers.

Typically, GPS receivers employ dedicated RF sections for both the L1 and the L2 frequencies for every antenna to be tracked. The RF section down converts L1 and/or L2 RF signal and samples the signals for further processing. However, it may be prohibitively expensive to have a dedicated L1/L2 RF section for each antenna to be tracked. Moreover, in applications where it is desirable to track the position of multiple GPS antennas on a moving platform, the resulting system becomes very bulky. GPS receivers used for such applications usually employ multiplexing of both L1 as well as L2 signals to reduce the hardware cost. A patent that refers to such a GPS receiver is U.S. Pat. No. 6,154,170 titled 'Enhanced Attitude Determination System Using Satellite Navigation Receiver With Antenna Multiplexing', granted to Trimble Navigation Limited, Sunnyvale, Calif. Yet another patent that describes a system that multiplexes RF signals for multiple antennas is U.S. Pat. No. 5,917,448 titled 'Attitude Determination System With Sequencing Antenna Inputs', granted to Rockwell Science Center Inc. of Thousand Oaks, Calif.

Although, some of the abovementioned patents do refer to multiplexing for reducing the hardware cost, the SNR for L1/L2 measurements is low as the RF sections receive signals only for a fraction of the time. Hence, there exists a need for a system that derives L1/L2 signals with a high SNR and low hardware cost.

SUMMARY

The present invention is directed to a measurement system that satisfies the need for a system that tracks an object with very little incremental hardware cost per additional antenna, and at the same time improves the SNR of the carrier phase of a primary frequency RF signal.

One object of the present invention is to calibrate slowly changing line biases in the primary frequency RF sections.

Some embodiments provide for a measurement system for tracking position of multiple antennas to centimeter level accuracy. The system requires very little incremental hardware cost per additional antenna to be tracked. Carrier phase of the signals received from a satellite are used to determine relative positions of the antennas. A splitter dedicated to each antenna to be tracked splits the radio frequency signal received from the satellite into at least two output signals.

Thereafter, primary frequency RF signals are filtered, down converted and sampled by a primary frequency RF section dedicated to each antenna. The primary frequency RF section outputs sampled primary signals. Secondary frequency RF signals from all antennas are multiplexed and input to a secondary frequency RF section corresponding to each secondary frequency. The secondary frequency RF section filters, down converts and samples multiplexed secondary frequency RF signals to output sampled secondary signals. A correlator then derives code and carrier phase measurements for the primary and secondary frequency RF signals. A processor extrapolates the sampled secondary signals and resolves carrier cycle ambiguities for the sampled primary signals using the carrier phase of the sampled secondary signals. Finally, the phase of the primary signals is used to determine relative positions of the antennas. Using the position of the antennas, the object is tracked.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

Overview of the Invention

Figure 1:
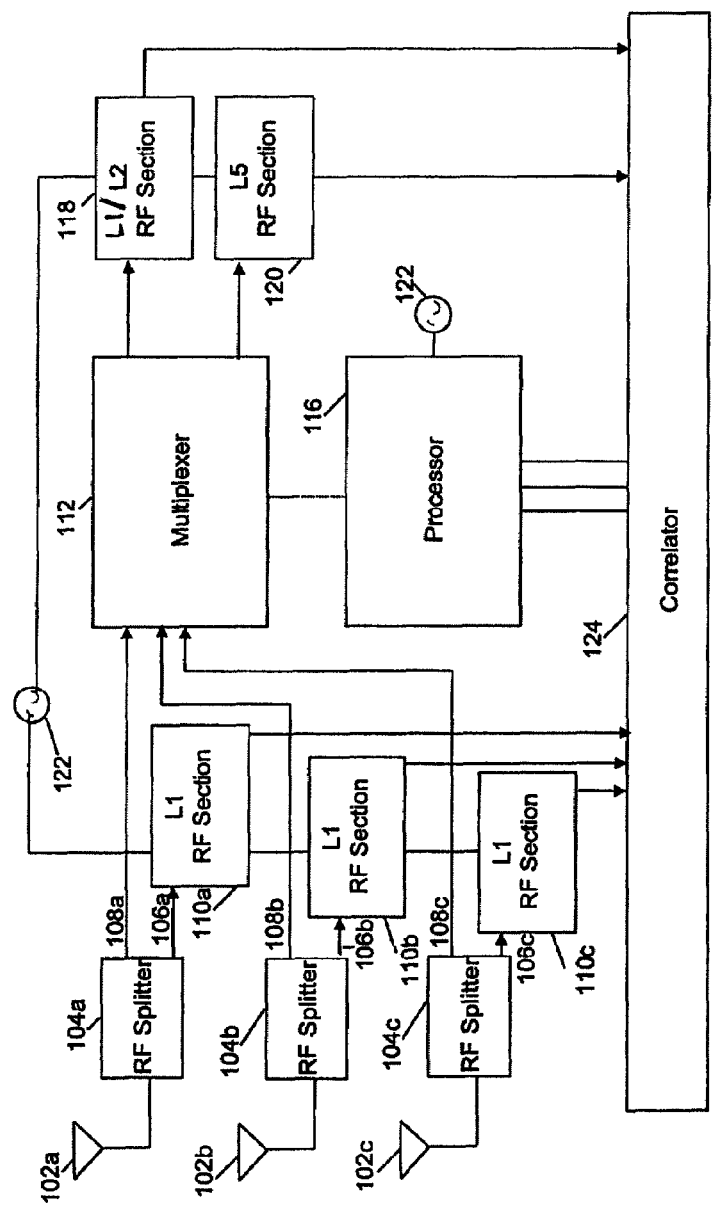
FIG. 1 is a block diagram of the measurement system in accordance with the preferred embodiment of the present invention.

The present invention provides a measurement system and an associated method for 'tracking an object' (or a number of objects). The phrase 'tracking an object', means finding position, and sometimes velocity, time, attitude and angular velocity associated with the object as well. For the purpose of tracking the object, the object is coupled to the measurement system. The measurement system comprises a number of antennas that are connected (or affixed) to the object so that the object may be tracked. For some applications, it may be desirable to track the position of an object with respect to the position of another object. For example, in case of a moving platform such as a farm tractor pulling a field implement, the antennas may be mounted both on the farm tractor as well as the field implement. Here, it is desirable to know the position of the antenna mounted on the tractor relative to the position of the antenna mounted on the field implement. All the antennas receive radio frequency (RF) signals from a plurality of (two or more) signal generating sources: satellites or pseudolite. A pseudolite (pseudo satellite) is a low power transmitter that transmits an RF signal, most commonly at the L1 RF frequency. Typically, a pseudolite transmits signals at a higher power as compared to GPS satellites for a shorter range.

The RF signal that is received by the antenna comprises a primary frequency RF signal and at least one secondary frequency RF signal. If there are more than one secondary frequency RF signals, each secondary frequency RF signal propagates through space at a different frequency.

Each of these RF signals, upon reception by the antenna, is passed through an RF splitter. The RF splitter splits the RF signals into two output signals: a first output signal and a second output signal. Both the first output signal and the second output signal include the primary frequency RF signal and all the secondary frequency RF signals. The number of antennas and RF splitters is same with a one-to-one connection between the two i.e. each antenna is connected to a different RF splitter.

The first output signal from each of the RF splitters is sent to a primary frequency RF section. Each primary frequency RF section is connected to a different antenna. The primary frequency RF section processes the first output signal to output a sampled primary signal. This processing involves the following steps: filtering of the first output signal to obtain the primary frequency RF signal; down converting of the primary frequency RF signal; and sampling of the primary frequency RF signal. Just as there is a different RF splitter connected to each of the antennas, there is a different primary frequency RF section connected to each of the RF splitters i.e. the number of the primary frequency RF sections is equal to the number of the RF splitters.

The second output signal from each of the RF splitters is sent to a multiplexer. The function of the multiplexer is to switch between the second output signals to output one or more (at least one) multiplexed signals. The multiplexer is connected to all the RF splitters such that input to the multiplexer comprises the second output signal from each of the RF splitters i.e. the number of inputs of the multiplexer is equal to the number of the RF splitters, which in turn is equal to the number of the antennas.

Each of the multiplexed signals is sent to a different secondary frequency RF section. Each secondary frequency RF section operates at a secondary frequency; although the secondary frequency for different secondary frequency RF sections need not be different always i.e. it is possible that more than one secondary frequency RF sections operate for the same secondary frequency. All the secondary frequency RF sections are connected to the output of the multiplexer. The function of the secondary frequency RF section is the same as that of the primary frequency RF section i.e. the secondary frequency RF section processes the multiplexed second output signal to output a sampled secondary signal. This processing involves the steps of filtering of the multiplexed second output signal to obtain the secondary frequency RF signal, and down converting and sampling of the secondary frequency RF signal.

The number of the secondary frequency RF sections is dependent upon the number of secondary frequencies in use. A possibility is that the number of secondary frequency RF sections is the same as the number of secondary frequencies in use i.e. there is just one secondary frequency RF section for each of the secondary frequencies with each of the secondary frequency RF sections operating for the corresponding secondary frequency.

Another possibility is that the number of secondary frequency RF sections is more than the number of secondary frequencies in use. In this case, there will be more than one secondary frequency RF section operating for the same secondary frequency. This implies the following: the secondary frequency RF signals (for the same secondary frequency) received by more than one antenna will be processed simultaneously (i.e. in parallel). This improves the accuracy of the measurement system.

The primary sampled signals (output by the primary frequency RF sections) and the secondary sampled signals (output by the secondary frequency RF sections) are input to a correlator. The correlator is connected to all the primary frequency RF sections as well as all the secondary frequency RF sections. The correlator derives the code and carrier phase for the primary frequency RF signals by correlating the sampled primary signals. Because of multiplexing, the secondary frequency RF signals from all the antennas are not available to the correlator at all times. Hence, the correlator derives initial code and initial carrier phase for the secondary frequency RF signals by only correlating the sampled secondary signals.

All the code and carrier phase information generated by the correlator is passed over to a processor. The processor reconstructs the carrier phase of the secondary frequency RF signal using the initial carrier phase of the secondary frequency RF signal and the carrier phase of the primary frequency RF signal. This is done by extrapolating the carrier phase of the secondary frequency RF signal from the initial carrier phase using the fact that both the primary frequency RF signal and the secondary frequency RF signal are generated using the same clock in the satellite; because of this, there is a constant frequency ratio between the primary frequency RF signal and the secondary frequency RF signal.

Thereafter, the processor resolves carrier cycle ambiguities for the primary frequency RF signal using the carrier phase of the primary frequency RF signal and the carrier phase of the secondary frequency RF signal for all pairs of antennas in the system.

A method comprising the above-mentioned steps of reconstructing carrier phase and resolving carrier cycle ambiguities is hereinafter referred to as an intra-platform parallel processing algorithm. This algorithm is described in detail below.

The carrier phase for the secondary frequency RF signal is extrapolated using the following formula:

$$\phi_2(t) = \phi_2(t_0) + (\phi_1(t) - \phi_1(t_0)) * (f_2/f_1) \quad (1)$$

where, $\phi_2$ is the carrier phase of the secondary frequency RF signal;

$\phi_1$ is the carrier phase of the primary frequency RF signal;

$f_2$ is the frequency of the secondary frequency RF signal;

$f_1$ is the frequency of the primary frequency RF signal;

$t_0$ is the instant of time when the carrier phase of the secondary frequency RF signal was last measured; and t is the time at which the carrier phase of the secondary frequency RF signal is to be determined.

When the RF signals leave the satellite, the ratio of frequencies of primary and secondary frequency RF signals is equal to $f_2/f_1$. But due to ionospheric effects, this relation between the ratio of RF frequencies and $f_2/f_1$, is not exactly true when the antennas receive the RF signals. However, it is a very good approximation over several seconds (3-10 cycles over an hour is a representative figure). Moreover, the use of this algorithm enables the measurement system to resolve carrier cycle ambiguities very quickly. This is possible since carrier phases of secondary frequency RF signals for one antenna can be correlated and for all the other antennas, the carrier phase can be extrapolated at any point of time. Therefore, it is adequate for most applications to have just one RF section per secondary frequency.

This completes the description of the extrapolation step in the intra-platform parallel processing algorithm. The carrier cycle ambiguities may be resolved using any of the methods known in the art.

After having resolved carrier cycle ambiguities, the processor obtains the position of the antennas using code and phase measurements for the primary frequency RF signal. In an alternate embodiment, the code and phase measurements for the secondary frequency RF signal are also used in determining position; the main purpose of using the secondary frequency RF signals is to observe ionospheric delays.

Thereafter, the processor uses positions of the antennas to track the object i.e. it finds the position, velocity, time, attitude and angular velocity associated with the object. This may be accomplished by employing any of the methods known in the art.

Hereinafter, other algorithms for resolving the carrier cycle ambiguity for the primary frequency RF signal are described in detail. An algorithm for calibrating the RF path biases for multiple primary frequency RF sections is also described.

Inter-platform Parallel Processing Algorithm

In the inter-platform parallel processing algorithm, the measurement system is continuously receiving communication from a reference base station. This is the meaning of 'inter-platform'. However, in the intra-platform algorithm, there is no interaction of the measurement system with any reference base station.

The reconstruction step is the same as in the intra-platform parallel processing algorithm. In the case of inter-platform parallel processing, extrapolation of carrier phase for the secondary frequency RF signal is done between each antenna (on the object) and the reference base station antenna. However, in case of intra-platform parallel processing, extrapolation of carrier phase for the secondary frequency RF signal is done between antennas that are on the object itself.

Intra-platform Sequential Processing Algorithm

Sequential processing algorithms do not involve reconstruction of the carrier phase making them less sensitive to ionospheric effects. This is so because the ionospheric effect is different on the primary frequency RF signal and the secondary frequency RF signal. Due to this, reconstruction of the secondary frequency RF signal using the carrier phase of the primary frequency RF signal is slightly erroneous.

In the case of the intra-platform sequential processing algorithm, more than one secondary frequency RF section operates for the same frequency. Due to this, carrier cycle ambiguities for the secondary frequency RF signals for a pair of antennas are resolved simultaneously.

For example, assume that two of the secondary frequency RF sections operate at the same frequency. Using these two secondary frequency RF sections, resolution of carrier cycle ambiguities for the secondary frequency RF signal for any pair of antennas can be done. The multiplexer may be controlled (by the processor) such that by selecting a minimal set of antenna pairs, resolution of carrier cycle ambiguities for the secondary frequency RF signal for every pair of antennas is carried out. The minimal set of antenna pairs is defined to be that set of antenna pairs, for which, if the carrier cycle ambiguities have been resolved, the same can be resolved for all other antennas using the carrier cycle ambiguity resolution information of just those antennas that are in this set. By way of an example, assuming that there are 5 antennas: A, B, C, D and E, it is sufficient to resolve carrier cycle ambiguity for just A-B, B-C, C-D and D-E. After carrier cycle ambiguity for these four pairs has been resolved, any other pair can be expressed as a combination of pairs from this set e.g. carrier cycle ambiguity for B-D pair may be resolved, using corresponding information for B-C and C-D.

Inter-platform Sequential Processing Algorithm

This algorithm is similar to the intra-platform sequential processing algorithm in the following aspect: the multiplexer keeps switching from an antenna pair to another antenna pair until carrier cycle ambiguities for a minimal set of antenna pairs (or triplets, depending upon the number of secondary frequency RF sections operating for the same frequency) are resolved.

The difference between the two algorithms is as follows: in the inter-platform sequential processing algorithm, just one secondary frequency RF section is required, whereas, in the intra-platform sequential processing algorithm, at least two secondary frequency RF sections are required. This is because the measurement system is continuously receiving communication from the reference base station that makes up for the other secondary frequency RF section.

The minimal set in this case comprises the following: an antenna of the reference base station and a first antenna of the measurement system, the antenna of the reference base station and a second antenna of the measurement system, and so on. Once carrier cycle ambiguities for all such pairs have been resolved, the algorithm resolves carrier cycle ambiguities for any pair of antennas of the measurement system using the resolution information for carrier cycle ambiguities for the minimal set of antenna pairs.

In a variation of the inter-platform sequential processing algorithm, the reference base station has a plurality of antennas coupled to the measurement system. In this case, the reference base station also benefits from the present invention. By way of an example, the reference base station may have antennas DA, DB, DC, and the object may have antennas VA, VB, VC, etc. Sequential use of the secondary RF section switches the secondary RF sections to DA and VA, then to DB and VB, then to DC and VC, then to DA and VB, and finally to DA and VC. Once carrier cycle ambiguities for these 5 pairs of antennas have been resolved, all the information required to resolve carrier cycle ambiguities of any other pair of antennas is available to the measurement system. For example, the position of VA relative to VB and the position of DB relative to DA can be obtained by knowing the position of VA relative to DA and the position of VB relative to DB and the position of VB relative to DA.

RF Path Bias Calibration Algorithm

The present invention provides a RF path bias calibration algorithm that increases the accuracy of attitude determination.

Biases that change slowly with time may exist for different RF paths in a conventional multiple antenna GPS measurement system. This is because of variable time spent by the RF signals in the RF sections. In conventional systems, these delays are assumed to be constant over a period of time. But some L1 RF section designs have delays that do change with time. This is undesirable for tracking the attitude because conventional attitude processing algorithms often assume that delay from the antenna to the correlator can be calibrated just once and removed from all the subsequent measurements. The present invention can be used to eliminate these biases from all the measurements.

To support execution of this algorithm, the measurement system has an additional primary frequency RF section connected to the output of the multiplexer and to the correlator. In an alternate embodiment, one of the secondary frequency RF sections has the additional primary frequency RF section.

In the algorithm for calibrating RF path biases, first, the primary frequency RF section that needs to be calibrated is selected. Thereafter, the processor switches the multiplexer to connect the additional primary frequency RF section to the antenna connected to the primary frequency RF section to be calibrated. Subsequently, a first carrier phase for the primary frequency RF signal passing through the primary frequency RF section is measured. Similarly, the second carrier phase for the primary frequency RF signal passing through the additional primary frequency RF section is measured. Thereafter, the relative path delay for the primary frequency RF section using the first carrier phase and the second carrier phase is determined. All the abovementioned steps are repeated for all the primary frequency RF sections.

A Block Diagram in Accordance with the Preferred Embodiment

Referring now primarily to FIG. 1, an exemplery block diagram of the measurement system in accordance with the preferred embodiment of the present invention is illustrated. Antennas 102a, 102b and 102c are multiple frequency antennas, which receive signals at L1, L2 and L5 RF frequencies. The L1 RF signal is the primary frequency RF signal and the L2 and the L5 RF signals are the secondary frequency RF signals.

Antennas 102a, 102b and 102c receive L1, L2 and L5 signals from at least four GPS satellites for determining their position. Various position tracking algorithms exist in the art for tracking positions of the antennas using less than four satellites. The minimum number of satellites required for calculating the position of antennas 102a, 102b and 102c depends on the algorithm used. The present invention is applicable with all the position tracking algorithms.

RF signals received by antenna 102a are amplified, filtered and passed on to RF splitter 104a connected to antenna 102a. RF splitter 104a separates the power of the RF signal and outputs a first output signal 106a and a second output signal 108a. The first output signal is the RF signal that is fed into a primary frequency RF section.

The second output signal is the RF signal that is fed to a multiplexer for subsequent processing of secondary frequency RF signals. Antenna 102b and antenna 102c are connected to RF splitter 104b and RF splitter 104c, respectively. The signals output by RF splitters 104a through 104c include L1 RF signals, L2 RF signals and L5 RF signals. First output signal 106a is passed to L1 RF section 110a connected to RF splitter 104a. L1 RF section 110a is dedicated to the L1 RF signals from antenna 102a. L1 RF section 110a filters first output signal 106a and receives only the L1 RF signal. Similar filtering is performed by L1 RF section 110b and L1 RF section 110c on first output signal 106b and first output signal 106c, respectively to obtain the L1 RF signals. The L1 RF signal is thereafter down converted from the radio frequency to an intermediate frequency (IF). The down conversion is performed in order to bring down the frequency of the L1 signal from a higher radio frequency (RF) to a lower IF for facilitating processing of the L1 signals. The L1 RF signals have a frequency of 1575.42 MHz and they are usually down converted to an intermediate frequency such as 4 MHz. The IF signals are then sampled in L1 RF section 110a through 110c.

Second output signal 108a moves along a second path from RF splitter 104a to be fed to multiplexer 112 for multiplexing. Second output signals 108b and 108c are also fed to multiplexer 112 for multiplexing. The multiplexer switches between second output signal 108a, second output signal 108b and second output signal 108c for a controlled fraction of time. For this purpose, a processor 116 controls multiplexer 112. In an alternate embodiment, multiplexer 112 switches between the second output signals for a pre-configured fraction of time. Multiplexer 112 is a three input (the number of antennas) and two output (the number of secondary frequency RF sections) switch, which multiplexes the three incoming signals to output two signals. The two outputs of multiplexer 112 are connected to a secondary frequency (L2) RF section 118 and another secondary frequency (L5) RF section 120. Multiplexer 112 outputs RF signals from a particular antenna, say, antenna 102a for a fraction of time to L2 RF section 118 and L5 RF section 120. Thereafter, multiplexer 112 switches to RF signals from antenna 102b. Hence, at a given instant of time, L2RF section 118 and L5 RF section 120 receive RF signals from antenna 102a. At any time, L2 RF section 118 and L5 RF section 120 receive signals from antenna 102b.

L2 RF section 118 filters second output signal 108a (received via multiplexer 112) to output the L2 RF signals. L2 RF section 118 down converts and samples the L2 RF signals thus obtained. L1 RF sections 104a through 104c, L2 RF section 118 and L5 RF section 120 are all connected to a clock 122 for synchronous functioning of the RF sections.

The down converted and sampled L1 RF signals from L1 RF sections 110a, 110b and 110c, and the down converted and sampled L2 RF signals from L2 RF section 118 are forwarded to a correlator 124 for correlation. Correlator 124 can be embodied either as software or as hardware. The hardware embodiment of correlator 124 includes Random Access Memory (RAM) buffers and Field Programmable Gate Arrays (FPGA). Correlator 124 is implemented on one or more FPGAs depending on the number of antennas being tracked. Correlator 124 also consists of multiple buffer units for storing IF samples.

Correlator 124 correlates the down converted and sampled L1 RF signals and the L2 RF signals to derive code and carrier phases. Correlator 124 outputs an in-phase and a quadrature component of the sampled RF signal. Any standard algorithm known in the art may be used for the correlation of the L1 RF signals and the L2 RF signals. Some of these algorithms are described in the paper titled 'Optimum semi-codeless carrier phase tracking of L2', presented by K. T. Woo at The 12$^{th}$ International Technical Meeting of the Satellite Division of the Institute of Navigation, Nashville, Tenn., Sep. 14-17 1999. As the C/A code is known for the L1 RF signals, the L1 carrier and code signals may be separated with high-precision using methods already known in the prior art. The L2 RF signals may be correlated using the relationship between the phase of L1 RF signals and the phase of the L2 RF signals using any standard cross-correlation algorithm known in the art that reconstructs the L2 carrier. For military applications, the encryption code is known and the available decryption information is used to correlate the L2 RF signal.

The correlated L1 RF signals and the L2 RF signals are fed to processor 116 for further processing. Processor 116 resolves carrier cycle ambiguities of the L1 RF signal using the intra-platform parallel processing algorithm.

Processor 116 runs standard loop closure algorithms as real-time tasks to track L1 code and carrier phases. Processor 116 also uses the code and carrier phases to determine the position of each of the antennas using standard position tracking algorithms known in the prior art. Positions of the antennas thus derived are used to track the object. The position of the object may be output to an external user; it may also be used by any other method for further processing.

Applications and Advantages of the Preferred Embodiment

The preferred embodiment of the present invention is applicable to any positioning system, although exemplary embodiments of the invention have been illustrated with respect to the GPS. The system may also be used in other positioning systems including Global Orbiting Navigation Satellite System (GLONASS), pseudolite augmented systems, or any other positioning system that emits RF signals for tracking an object. The object may be mobile or stationary, such as—but not limited to—a vehicle, a pole, an aircraft, a ship, a boat, or a train.

With reference to systems and/or methods employing dedicated RF sections for all the RF signals from all the antennas, the present invention provides the advantage of less incremental cost per any extra antenna that is added to the system. The total number of secondary frequency RF sections used in the preferred embodiment of the present invention is equal to the number of secondary frequency RF signals, whereas in prior systems with a dedicated hardware for each antenna, the number of secondary frequency RF sections is equal to the number of antennas in the system, which may be very large depending upon the application. This is achieved by multiplexing all the secondary frequency RF signals, thereby using only one secondary frequency RF section for all the secondary frequency RF signals.

Yet another advantage of the preferred embodiment of the present invention enhanced accuracy for attitude processing systems by virtue of real time calibration of RF path biases.

Alterations to the Preferred Embodiment

Some variations of the preferred embodiment of the present invention are discussed hereinafter. For civilian applications, the dedicated L1 RF sections commonly have narrow-band RF sections with a bandwidth of 2 MHz. Narrow-band RF sections have sufficient bandwidth to capture most of the power in the L1 C/A code signal but cannot capture the L1 Y code signal. For example, a Zarlink GP2015 chip may be used as a narrow-band L1 RF section. Civilian applications with no knowledge about encryption of the P code employ cross-correlation using the L1 RF signals. Hence, to capture the Y code of the L1 RF signal, a dual frequency L1/L2RF section is used with two 20 MHz band-pass filters (one centered at the L1 RF frequency and the other one at the L2 RF frequency) for capturing the 10 MHz Y code modulated on both the L1 and the L2 RF signals.

In another variation of the preferred embodiment (for civilian applications), a wide-band 20 MHz L1 RF section is used. In this case, only a 20 MHz L2 RF section is required for capturing the L2 RF signal.

In yet another variation of the preferred embodiment (for military applications with known encryption of the L2 RF signal), a single wideband 20 MHz L2 RF section at the output of the multiplexer is used. In this case, the L1 RF section may also be a wide band 20 MHz L1 RF section. Although military receivers do not perform cross-correlation of the L2 RF signals, typically, the Y code on both the L1 and the L2 RF signals is tracked using wide band RF sections. This is done to prevent jamming and for anti-spoofing purposes.

In still another variation of the preferred embodiment, K of the M secondary frequency RF sections operate at the same secondary RF frequency. Therefore, K secondary frequency RF sections process secondary frequency RF signals from K antennas in parallel i.e. simultaneously. By way of an example, assume that N=4, K=2, the primary frequency is L1, the secondary frequency is L2, where N is the total number of antennas. This implies that there are 4 L1 RF sections and two L2 RF sections. In this case, the measurement system can simultaneously track L1 RF signals from 4 antennas and L2 RF signals from 2 antennas. This improves the accuracy of the system.

An Alternate Embodiment of the Present Invention

Hereinafter, an alternate embodiment of the present invention is described. The alternate embodiment of the measurement system comprises a plurality of antennas receiving RF signals from a plurality of signal generating sources. Each RF signal consists of a primary frequency RF signal and at least one secondary frequency RF signal.

An array of dedicated RF splitters is used to split these RF signals into a plurality of output signals. The RF splitters split the RF signals into a first output signal and at least one second output signal; the number of second output signals being dependent on the number of secondary frequencies present in the RF signals.

The first output signals from all the antennas are filtered, down converted and sampled to obtain sampled primary signals using a primary frequency RF section dedicated to each of the antennas. Hence, every antenna has one RF splitter and one primary frequency RF section associated with it.

Each primary frequency RF section is connected to a separate first correlator. The sampled primary signals are passed on to the corresponding first correlator so that code and carrier phases for the primary frequency RF signals may be resolved.

One stream of the second output signal from each of the antennas is fed to every multiplexer (there is a separate multiplexer associated with each RF splitter), i.e. each RF splitter sends a second output signal to every multiplexer. The multiplexer switches between all the second output signals from all the antennas. Each multiplexer is connected to just one secondary frequency RF section. Hence, each secondary frequency RF section receives second output signals from an antenna for a fraction of time.

Each secondary frequency RF section filters the second output signal to derive a secondary frequency RF signal, which is then down converted and sampled. The number of multiplexers and secondary frequency RF sections is the same as the number of secondary frequencies present in the RF signals received by the antennas.

All the sampled secondary signals are sent to a second correlator, which is connected to all the secondary frequency RF sections. In yet another embodiment of the present invention, the second correlator is connected to all the secondary frequency RF sections through buffers that are controlled by the processor. The second correlator derives code and carrier phases for all the secondary frequency RF signals, which are then passed on to the processor.

The processor resolves carrier cycle ambiguities for the primary frequency RF signals employing any of the aforementioned algorithms: the intra-platform parallel processing algorithm, the intra-platform sequential processing algorithm, the inter-platform parallel processing algorithm and the inter-platform sequential processing algorithm. The measurement system uses the last two algorithms, whenever it is receiving communication from the reference base station. The processor calculates the position of all the antennas using code and phase measurements for the primary frequency RF signals. The processor uses the position information of the antennas to continuously track the object.

The processor also calibrates the RF path biases for the primary frequency RF sections using the RF path bias calibration algorithm.

All the applications and advantages of the preferred embodiment are applicable to the alternate embodiment as well.

A Block Diagram in Accordance with the Alternate Embodiment

Figure 2:
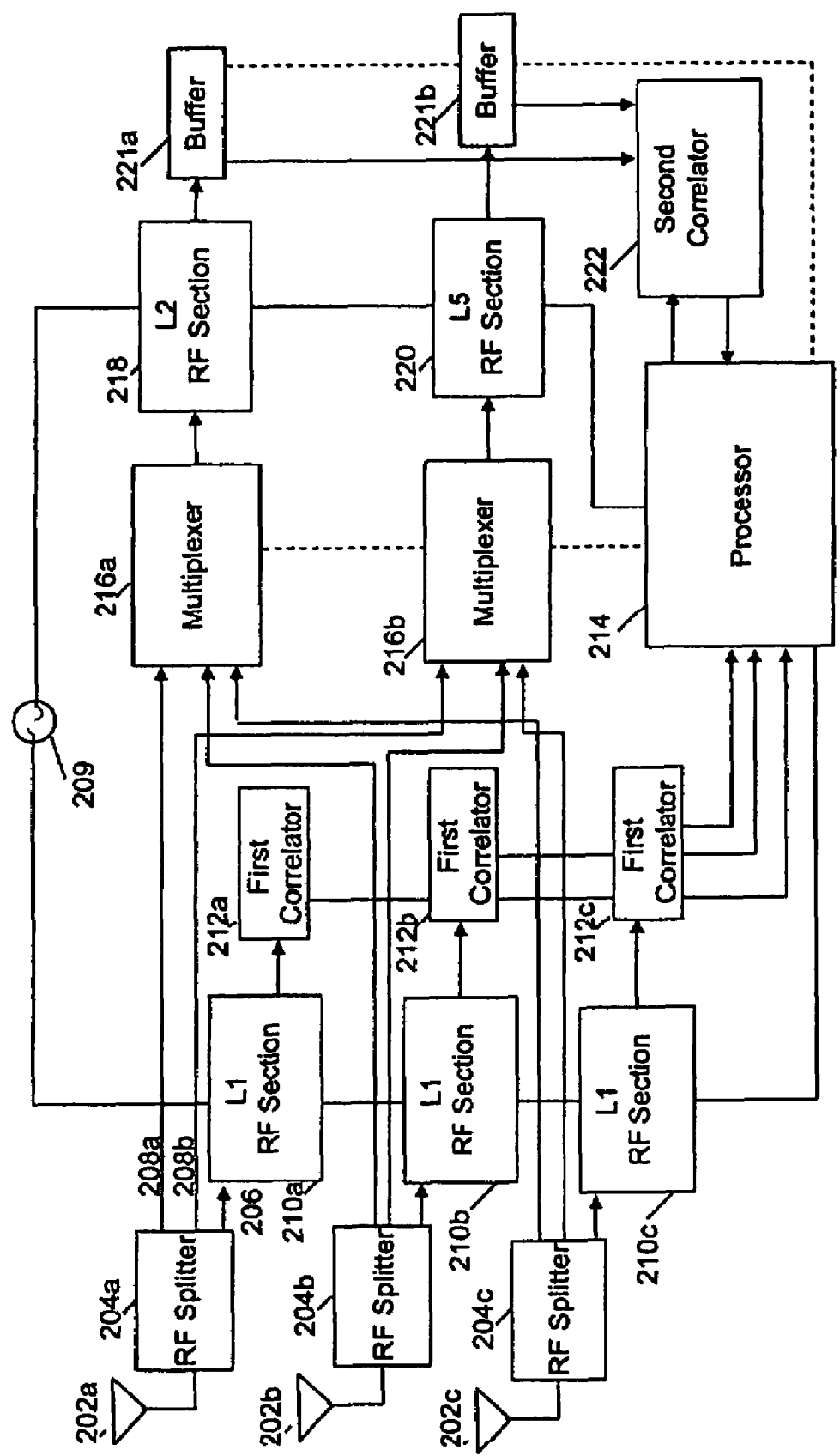
FIG. 2 is a block diagram of the measurement system in accordance with an alternate embodiment of the present invention.

Referring now primarily to FIG. 2, an exemplary block diagram of the measurement system in accordance with an alternate embodiment of the present invention is illustrated. The alternate embodiment differs from the preferred embodiment in the manner in which the correlated L1 signals are fed to a second correlator 222 for cross-correlation of the L2 RF signals. In the alternate embodiment, the correlated L1 signals are fed to second correlator 222 through a processor 214 for cross-correlation of down converted and sampled L2 RF signals. On the contrary, in the preferred embodiment, correlation of both the RF signals is performed by correlator 124.

Henceforth, the alternative embodiment illustrated by FIG. 2 shall be described with reference to the antenna 202*a*. The description provided with respect to antenna 202*a* should be construed for antennas 202*b* and 202*c* as well; elements such as splitters, first output signal, second output signal, L1 RF sections and L2 RF section referred with respect to antenna 202*a* should be construed as corresponding elements for antennas 202*b* and 202*c* as well.

Antennas 202*a*, 202*b* and 202*c* receive multiple frequency signals from multiple GPS satellites. Input signals received by antenna 202*a* are amplified, filtered and sent to an RF splitter 204*a* dedicated to antenna 202*a*. RF splitter 204*a* outputs a first output signal 206 and two second output signals i.e. second output signal 208*a* and second output signal 208*b*. The first output signal is the signal that is fed to a primary frequency RF section. The second output signal is the signal that is fed to a multiplexer for subsequent processing of secondary frequency RF signals. All the output signals of RF splitters 204*a* through 204*c* include the L1 frequency signals and the L2 frequency signals. First output signal 206 is fed to an L1 RF section 210*a* connected to RF splitter 204*a*. L1 RF section 210*a* is dedicated to the L1 RF signals received from antenna 202*a*. Antenna 202*b* has an L1 RF section 210*b* dedicated to it and antenna 202*c* has an L1 section 210*c* dedicated to it.

L1 RF section 210*a* filters the first output signal 206 and receives only the L1 signal. Similar filtering is performed by L1 RF section 210*b* and L1 RF section 210*c* on first output signal to obtain the L1 RF signal. The L1 RF signal is thereafter down converted from RF to an IF and sampled. IF down conversion and sampling for each of L1 RF sections 210*a* through 210*c* is phase locked to an oscillator 209. The L1 sampled signals are sent to corresponding first correlators 212a through 212c, which correlate the input L1 RF signal with the C/A code. First correlators 212a, 212b and 212c output a set of in-phase and quadrature signals that are sent to a processor 214 for further processing.

Second output signal 208a moves along a second path from RF splitter 204a to be fed to a multiplexer 216a for multiplexing. Multiplexer 216a switches between the second output signals from RF splitters 204a through 204c. Thus, multiplexer 216a receives one of the second output signals from each of the RF splitters 204a through 204c. Multiplexer 216a switches between second output signal 208a received from RF splitter 204a, the second output signal received from RF splitter 204b and the second output signal received from RF splitter 204c for a pre-configured fraction of time. Multiplexer 216a is dedicated to an L2 RF section 218.

Second output signal 208b moves along a third path from RF splitter 204a to be fed to another multiplexer 220 for multiplexing. Multiplexer 216b is dedicated to an L5 RF section 220. Multiplexer 216b receives the other second output signal from each of the RF splitters 204a through 204c. Multiplexer 216b switches between second output signal 208b received from RF splitter 204a, the second output signal received from RF splitter 204b and the second output signal received from RF splitter 204c for a pre-configured fraction of time.

L2 RF section 218 and L5 RF section 220 filter, down convert and sample the L2 RF signal and the L5 RF signal, respectively. L2 RF section 218 outputs sampled L2 RF signals. Similarly, L5 RF section 220 outputs sampled L5 RF signals. The sampled L2 RF signals and the sampled L5 RF signals are stored in a buffer 221a and a buffer 221b, respectively. Buffers 221a and 221b are embodied on a RAM. The sampled L2 RF signals stored in buffer 221a are fed to a second correlator 222 upon command from processor 214. Second correlator 222 performs cross-correlation between the sampled L2 RF signals and the tracked L1 phases received from processor 214. The cross-correlation of the sampled L2 RF signals is performed to derive code and carrier phases of the L2 RF signals. Similarly, code and carrier phases of the L5 RF signals are derived by the cross-correlation of the sampled L5 RF signals and the tracked L1 phases. The cross-correlation of the L2 RF signals is carried out using any of the standard cross-correlation algorithms known in the art. Second correlator 222 provides the initial code and the initial carrier phase for the L2 RF signals to processor 214 for reconstructing the L2 RF signals. The initial code and the initial carrier phase refer to the code and the carrier of the L2 RF signal, which is obtained for the available L2 RF signal (where some part of the L2 RF signal remains untracked due to multiplexing). Second correlator 222 is embodied on an FPGA.

Processor 214 uses the correlated L1 RF signals received from first correlators 212a through 212c and the initial code and the initial carrier phase for the L2 RF signals from second correlator 222 for determining carrier cycle ambiguities for the L1 RF signals. Processor 214 resolves carrier cycle ambiguities employing any of the following algorithms: the intra-platform parallel processing algorithm and the intra-platform sequential processing algorithm. If the measurement system is receiving communication from the reference station, the processor can use any one of the following algorithms for carrier cycle ambiguity resolution: the inter-platform parallel processing algorithm or the inter-platform sequential processing algorithm. Processor 214 also solves for positions of all the antennas using algorithms known in the prior art for carrier phase measurements. Positions of the antennas thus derived are used to track the object coupled to the antenna. All L1 RF sections 210a through 210c, L2 RF section 218, L5 RF section 220 and processor 214 are phase locked to oscillator 209 for synchronous operation.

While certain embodiments of the present invention have been illustrated and described, additional variations and modifications in these embodiments may occur to those skilled in the art once they learn of the basic inventive concepts. Values for various parameters mentioned in the description of the preferred embodiment are merely illustrative in nature. Therefore, it is intended that the appended claims shall be construed to include both the preferred embodiment, and all such variations and modifications as fall within the spirit and scope of the invention as described in the claims.

What is claimed is:

1. A measurement system for calibrating in an attitude determination receiver, the measurement system comprising:
   a plurality of antennas;
   a plurality of first filters, one filter for each antenna of the plurality of antennas, each filter operable to obtain information from a respective one of the plurality of antennas at a primary frequency;
   a second filter operable to connect with at least one of the plurality of antennas and operable on signals bypassing the first filters; and
   a processor operable to calibrate biases for the information at the primary frequency with a RF path bias calibration algorithm as a function of an output of the second filter based on the signals bypassing the first filters.

2. The system of claim 1 further comprising:
   a multiplexer operable to connect each of the plurality of antennas to the second filter.

3. The system of claim 1 wherein the second filter is operable to obtain information at a secondary frequency different than the primary frequency.

4. The system of claim 1 further comprising a splitter operable to output to one of the first filters and the second filter, the signals bypassing the first filters being output from the splitter to the second filter.

5. The system of claim 1 where the information comprises information from an orbiting satellite, and the primary frequency comprises a navigation satellite frequency.

* * * * *